(12) United States Patent
Kim et al.

(10) Patent No.: US 9,104,291 B2
(45) Date of Patent: Aug. 11, 2015

(54) METHOD, DISPLAY SYSTEM, AND COMPUTER SOFTWARE FOR CONTROLLING ICON APPEARANCE

(71) Applicant: LG Electronics Inc., Seoul (KR)

(72) Inventors: Hong-Ki Kim, Daegu (KR); Seok-Hwa Jeong, Gumi-si (KR); Ju-Ho Yun

(73) Assignee: LG ELECTRONICS INC., Seoul (KR)

( * ) Notice: Subject to any disclaimer, the term of this patent is extended or adjusted under 35 U.S.C. 154(b) by 395 days.

(21) Appl. No.: 13/652,925

(22) Filed: Oct. 16, 2012

(65) Prior Publication Data

US 2013/0042191 A1   Feb. 14, 2013

Related U.S. Application Data

(63) Continuation of application No. 10/675,969, filed on Oct. 2, 2003, now Pat. No. 8,316,312.

(30) Foreign Application Priority Data

Oct. 30, 2002   (KR) .............................. 10-2002-66618

(51) Int. Cl.
    *G06F 3/0481*    (2013.01)
    *G06F 3/048*    (2013.01)
    *G06F 3/0484*    (2013.01)

(52) U.S. Cl.
    CPC ............ *G06F 3/0481* (2013.01); *G06F 3/0484* (2013.01)

(58) Field of Classification Search
    CPC ...... G06F 3/048; G06F 3/0481; G06F 3/0484

USPC .......................................................... 715/846
See application file for complete search history.

(56) References Cited

U.S. PATENT DOCUMENTS 5,347,627 A    9/1994    Hoffmann et al.
5,367,626 A *  11/1994  Morioka et al. ............... 715/837

(Continued)

FOREIGN PATENT DOCUMENTS

JP    07-281863    10/1995
JP    2000-020213    1/2000

OTHER PUBLICATIONS

Pogue, David et. al. "Mac OS X the missing manual: Jaguar" Jan. 2002.*

(Continued)

*Primary Examiner* — Steven B Theriault
(74) *Attorney, Agent, or Firm* — Lowe Hauptman & Ham, LLP

(57) ABSTRACT

A method, display system, computer software product for controlling an icon appearance are disclosed. A display controller of the display system displays an icon control window on a display screen of the display system for changing an icon appearance of the display system conveniently. The control window includes at least one sample icon for a user's preview, and the sample icon's appearance is automatically updated upon receiving inputs for a new icon appearance from a user. When the user is satisfied with the updated sample icon's appearance and enters an execution command, the display controller finally changes the icon appearance of the display system by changing corresponding display properties according to the user inputs.

11 Claims, 9 Drawing Sheets

(56) References Cited

U.S. PATENT DOCUMENTS

| | | | |
|---|---|---|---|
| 5,477,241 A | 12/1995 | Higgins et al. | |
| 5,479,497 A | 12/1995 | Kovarik | |
| 5,544,288 A * | 8/1996 | Morgan et al. | 715/801 |
| 5,548,692 A * | 8/1996 | Cok | 715/815 |
| 5,751,283 A * | 5/1998 | Smith | 715/798 |
| 5,903,265 A * | 5/1999 | Bogdan | 715/800 |
| 5,905,492 A | 5/1999 | Straub et al. | |
| 5,977,966 A * | 11/1999 | Bogdan | 715/800 |
| 6,091,411 A | 7/2000 | Straub et al. | |
| 6,111,573 A * | 8/2000 | McComb et al. | 715/763 |
| 6,151,643 A | 11/2000 | Cheng et al. | |
| 6,167,523 A | 12/2000 | Strong | |
| 6,330,577 B1 * | 12/2001 | Kim | 715/210 |
| 6,335,743 B1 * | 1/2002 | Owings | 715/801 |
| 6,347,397 B1 | 2/2002 | Curtis | |
| 6,362,841 B1 | 3/2002 | Nykanen | |
| 6,363,499 B1 | 3/2002 | Delo et al. | |
| 6,392,673 B1 * | 5/2002 | Andrew et al. | 715/800 |
| 6,446,255 B1 | 9/2002 | Curtis et al. | |
| 6,456,307 B1 * | 9/2002 | Bates et al. | 715/838 |
| 6,515,682 B1 | 2/2003 | Washington et al. | |
| 6,590,590 B1 | 7/2003 | Wen et al. | |
| 6,615,278 B1 | 9/2003 | Curtis | |
| 6,704,933 B1 | 3/2004 | Tanaka et al. | |
| 6,820,136 B1 | 11/2004 | Pham et al. | |
| 6,983,424 B1 | 1/2006 | Dutta | |
| 6,993,760 B2 | 1/2006 | Peev et al. | |
| 7,032,220 B2 | 4/2006 | Curtis | |
| 7,117,450 B1 * | 10/2006 | Chaudhri | 715/787 |
| 7,146,387 B1 | 12/2006 | Russo et al. | |
| 7,216,304 B1 * | 5/2007 | Gourdol et al. | 715/835 |
| 7,395,387 B2 | 7/2008 | Berkowitz et al. | |
| 7,539,939 B1 * | 5/2009 | Schomer | 715/269 |
| 7,596,611 B1 | 9/2009 | Satish et al. | |
| 7,730,359 B2 | 6/2010 | Clarke | |
| 7,865,844 B2 | 1/2011 | Lahiri | |
| 8,132,116 B1 * | 3/2012 | Schendel | 715/764 |
| 8,607,161 B2 * | 12/2013 | Solanki et al. | 715/815 |
| 2002/0054144 A1 * | 5/2002 | Morris-Yates | 345/809 |
| 2002/0103973 A1 | 8/2002 | Zimniewicz et al. | |
| 2003/0045315 A1 * | 3/2003 | Vasa | 455/517 |
| 2003/0212736 A1 | 11/2003 | Kotnur et al. | |
| 2004/0025043 A1 | 2/2004 | Gallagher et al. | |
| 2006/0132812 A1 * | 6/2006 | Barnes et al. | 358/1.11 |
| 2007/0174782 A1 * | 7/2007 | Russo | 715/781 |
| 2007/0209022 A1 | 9/2007 | Gourdol et al. | |
| 2008/0074384 A1 * | 3/2008 | Orr et al. | 345/156 |
| 2010/0037218 A1 | 2/2010 | Romm et al. | |

OTHER PUBLICATIONS http://en.wikipedia.org/wiki/PowerBook_G4, retrieved Jan. 11, 2015.*

Portrait Dislplays, Inc.: "LiquidView v2.0 Product Overview": Jul. 2, 2002; (Retrieved from: http://ie2.portrait.com/pdf/liquidview.pdf); 3 pages.

Portrait Dislplays, Inc.; "Learn How Portrait Displays' LiquidView 2.0 Can Bring On-Screen Navigation Into Focus": Jul. 16, 2002; (Retrieved from: http://www.portrait.com/us/press/portrait_advertorial_2.pdf); 3 pages.

Eisen et al.; "Sizing of Icons to the User's Preference"; Feb. 1990; IBM Technical Disclosure Bulletin; vol. 32; No. 9A; p. 277.

Axialis Software Inc. et al.; "Axialis IconWorkshop 5.02"; 2002; 126 pages.

* cited by examiner

METHOD, DISPLAY SYSTEM, AND COMPUTER SOFTWARE FOR CONTROLLING ICON APPEARANCE

CROSS-REFERENCE TO RELATED APPLICATIONS

This application is a Continuation Application of U.S. application Ser. No. 10/675,969 filed Oct. 2, 2003, which claims priority from Korean Application No. P2002-66618, filed on Oct. 30, 2002, the subject matters of which are incorporated herein by reference.

BACKGROUND OF THE INVENTION

1. Field of the Invention

The present invention relates to the display control, and more particularly, to a method, display system, and computer program product for controlling an icon appearance.

2. Discussion of the Related Art

In general, personal computer (PC) systems are run by an operating system (OS), which is software designed to control the hardware of a specific data-processing system in order to allow users and application programs to employ it easily. Some of the well-known operating systems are Windows-based operating systems (e.g., Windows 98 and Windows XP for PCs) that provide a graphical operating environment for PC users and have multitasking capabilities.

The Windows-based PC users may interact with the computer systems through a Graphic User Interface (GUI), which includes windows, scroll bars, icons, buttons, and many others. The icons are visual representations of programs, documents, sound files, image files, and commands. For example, PC users may open an image file by selecting or clicking an icon representing the image file without memorizing and manually entering the required commands for opening the file into the computer system. For this reason, icons play a crucially important role in the GUI environment for the Windows-based PC systems.

PC users often wish to adjust the appearance (e.g., size) of the icons in the GUI for clearly understanding what each icon represents or for his or her individual preference. For example, when the icons displayed on a high-resolution screen are too small, the users may not be able to easily recognize what each icon represents. The existing manner of changing or adjusting the appearance of the icons involves quite complex processes. For example, if a user wishes to change the size of the icons in a computer system run by Windows XP, the user initially opens the control panel, select Display Properties option located within the control panel, and selects the Appearance menu. In this menu, the user is able to select a desired icon size, an icon font type, and a font size. In addition, the user may select horizontal and vertical distances among the icons. When the user makes all the icon-related selections in the Appearance menu and presses the Apply button, all the icons displayed on the monitor screen are resized according to the selections made by the user in the Appearance menu. If the user is not satisfied with the arrangement or sizes of the icons displayed on the screen, he or she must repeat the above process until the graphical configuration of the icons is satisfactory and this may put many PC users to a great deal of inconvenience.

SUMMARY OF THE INVENTION

Accordingly, the present invention is directed to a method, display system, and computer program for controlling icons that substantially obviates one or more problems due to limitations and disadvantages of the related art.

An object of the present invention is to provide a method, display system, and computer program for conveniently controlling an icon appearance by providing an icon control window in a Window-based computer system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of controlling an icon appearance of a display system having a display system is provided. The method includes the steps of backing up display properties of the display system, which are originally set for an original appearance, and displaying an icon control window on the display screen that includes at least one sample icon for a user's preview. The method further includes the steps of changing the sample icon's appearance according to inputs for a new icon appearance received from a user through the icon control window. The user inputs include at least one of an icon size, vertical icon spacing, horizontal spacing, icon font size, and icon font type. Finally, the icon appearance of the display system may be changed by changing the display properties of the display system according to the user inputs.

The icon control window displayed on the display screen may include an icon size controller, a preview region, and an execution controller. The icon size controller provides a plurality of selectable icon sizes for the user to be able to select a desired icon size from the selectable icon sizes. The preview region includes the sample icon, which is automatically resized when the user selects the desired icon size. The execution controller of the control window interfaces with the display system for changing an icon size of the display system according to the selected icon size.

Alternatively, the icon control window may include a plurality of manual input controllers for manually receiving the inputs for a new icon appearance, a preview region including the sample icon whose appearance gets automatically changed according to the manual inputs, and an execution controller interfacing with the display system for changing the display properties according to the manually received user inputs.

In another aspect of the present invention, a display system for conveniently changing an icon appearance is provided. The display system includes a memory, a display unit having a display screen, and a display controller coupled to the memory and the display unit. The display controller initially stores display properties of the display system in the memory, and it displays an icon control window including at least one sample icon on the display screen when a request is received from a user. Next, when inputs for a new icon appearance are received from the user, the controller initially changes the sample icon's appearance according to the received inputs for a preview. Finally, the control system changes an icon appearance of the display system by updating the display properties according to the user inputs.

In another aspect of the present invention, a computer software product for controlling an icon appearance of a display system having a display screen is provided. The software product includes a computer-readable medium storing program code for changing the icon appearance of the display system. When executed by a display controller, the program code causes the display controller to perform the steps of backing up display properties of the display system, displaying an icon control window including at least one sample icon on the display screen for a user's preview, and changing the sample icon's appearance according to the inputs for a new appearance received from a user. The program code further causes the display controller to change the icon appearance of the display system by updating the display properties according to the user inputs.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
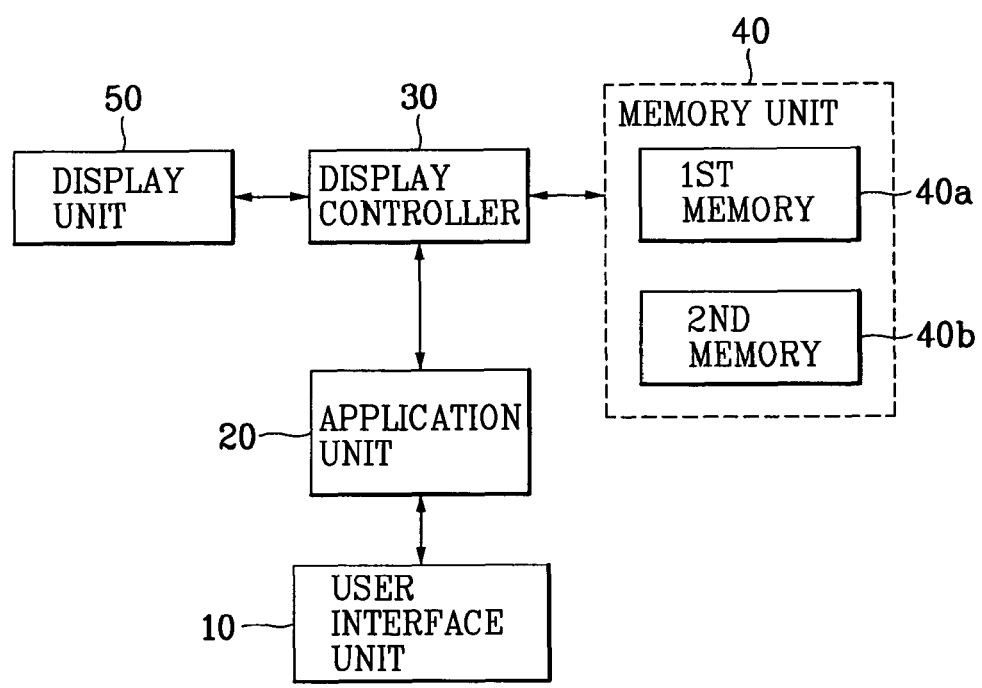
FIG. 1 illustrates a display system for controlling an icon appearance according to the present invention.

FIG. 1 illustrates a display system for controlling an icon appearance according to the present invention. The display system may be any one of computer systems including workstations, desktop computers, laptop computers, and personal data processing devices such as Personal Digital Assistants (PDAs) and palmtop computing devices. Referring to FIG. 1, the display system includes a user interface unit 10, an application unit 20, a display controller 30, a memory unit 40 including a first memory 40a and a second memory 40b, and a display unit 50 having a display screen. The user interface unit 10 may be any one of user-input devices including keyboards, mouses, and touch pads. The application unit 20 may be a computer control program that causes the display controller 30 to display an icon control window on the display screen, receive inputs from a user through the icon control window, and perform icon control functions according to the received inputs. In addition, the controller 30 may be a processor (e.g., microprocessor) that controls the display unit 50, the memory unit 40, and the application unit 20, and it may control other devices connected to the display system through system buses. The first and second memories 40a and 40b of the memory unit 40 may include Read-Only Memories (ROMs), Random Access Memories (RAMs), magnetic disks, magnetic tapes, optical disks, and other data-storage devices. The display unit 50 shown in FIG. 1 may be any one of cathode ray tub (CRT) displays and flat panel displays including liquid-crystal displays (LCDs) and plasma display panels (PDPs).

Figure 2:
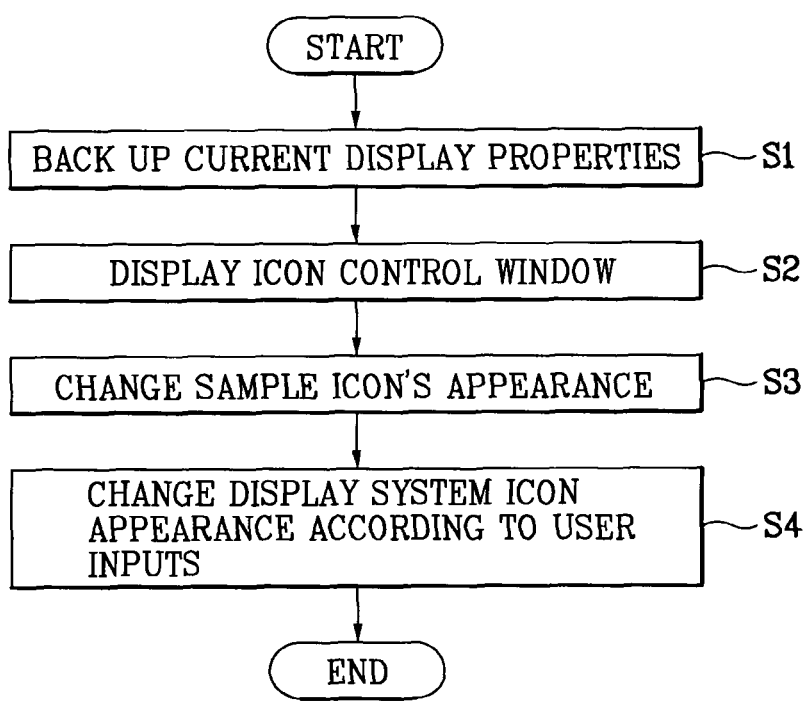
FIG. 2 is a flow chart illustrating a method of controlling an icon appearance used by the display controller shown in FIG. 1 according to the present invention.

FIG. 2 is a flow chart illustrating a method used by the display controller 30 for changing an icon appearance of the display system shown in FIG. 1 according to the present invention. As shown in FIG. 2, the method include four steps. The first step is to back up the icon-related display properties of the display system, which are set to the original icon appearance of the display system, in the memory unit 40 (S1). Next, the second step is to display an icon control window including one or more sample icons upon receiving a user's request (S2). The third step of the method shown in FIG. 2 is to change the sample icon's appearance in accordance with the user's inputs received through the icon control window (S3). The step of backing up the original display properties may be performed just before performing step S3. When the user finally determines a desired icon appearance and enters an execution command, the icon appearance of the display system is changed according to the user inputs by changing the display properties of the display system (S4). The user inputs may include at least one of an icon size, icon font type, icon font size, horizontal icon spacing, and vertical icon spacing. Any icons that are displayed on the display screen will conform to the newly selected icon appearance.

Figure 3A:
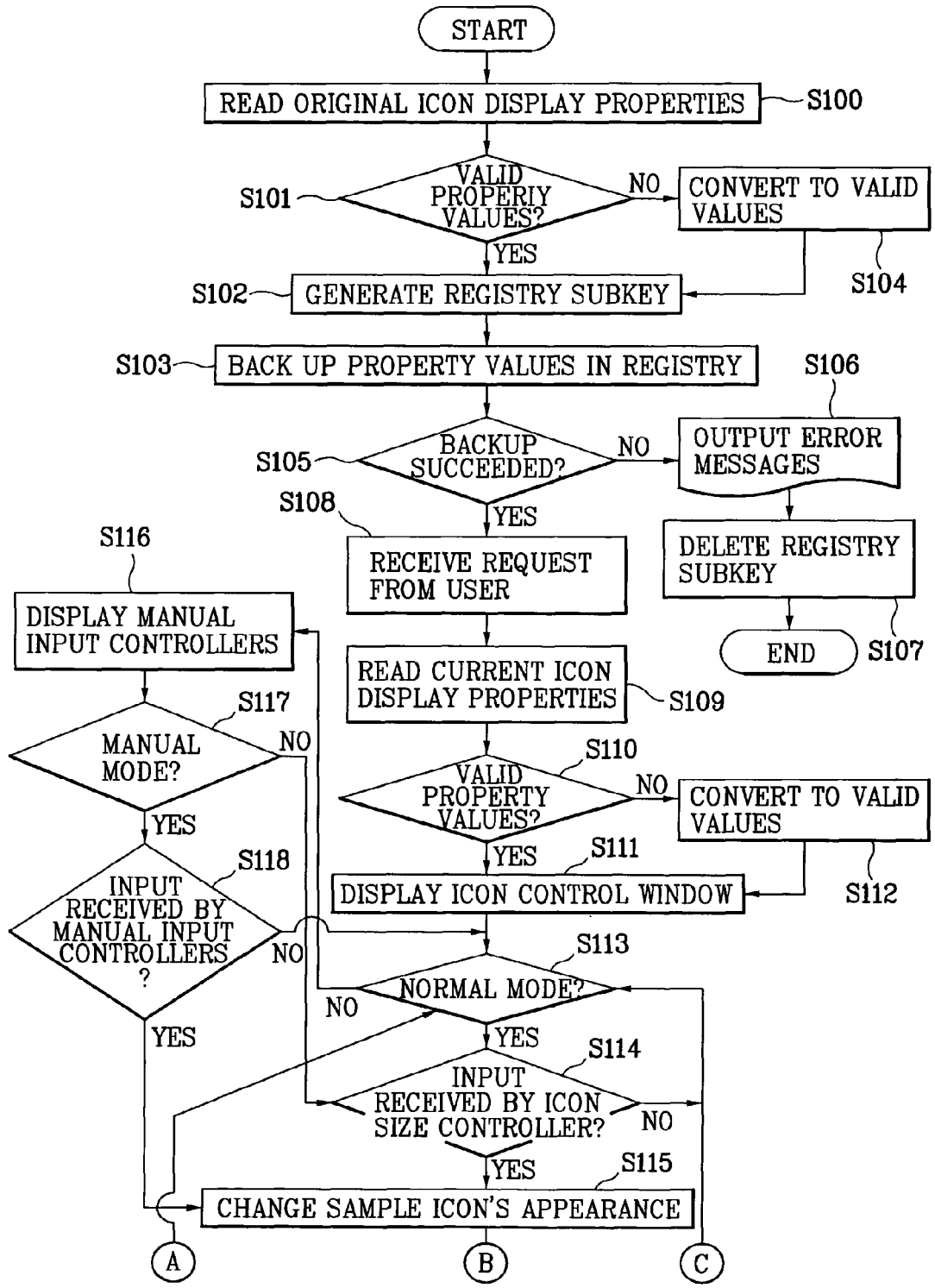
FIG. 3A and FIG. 3B illustrate example sub-steps of each step shown in FIG. 2 in detail.
Figure 3B:
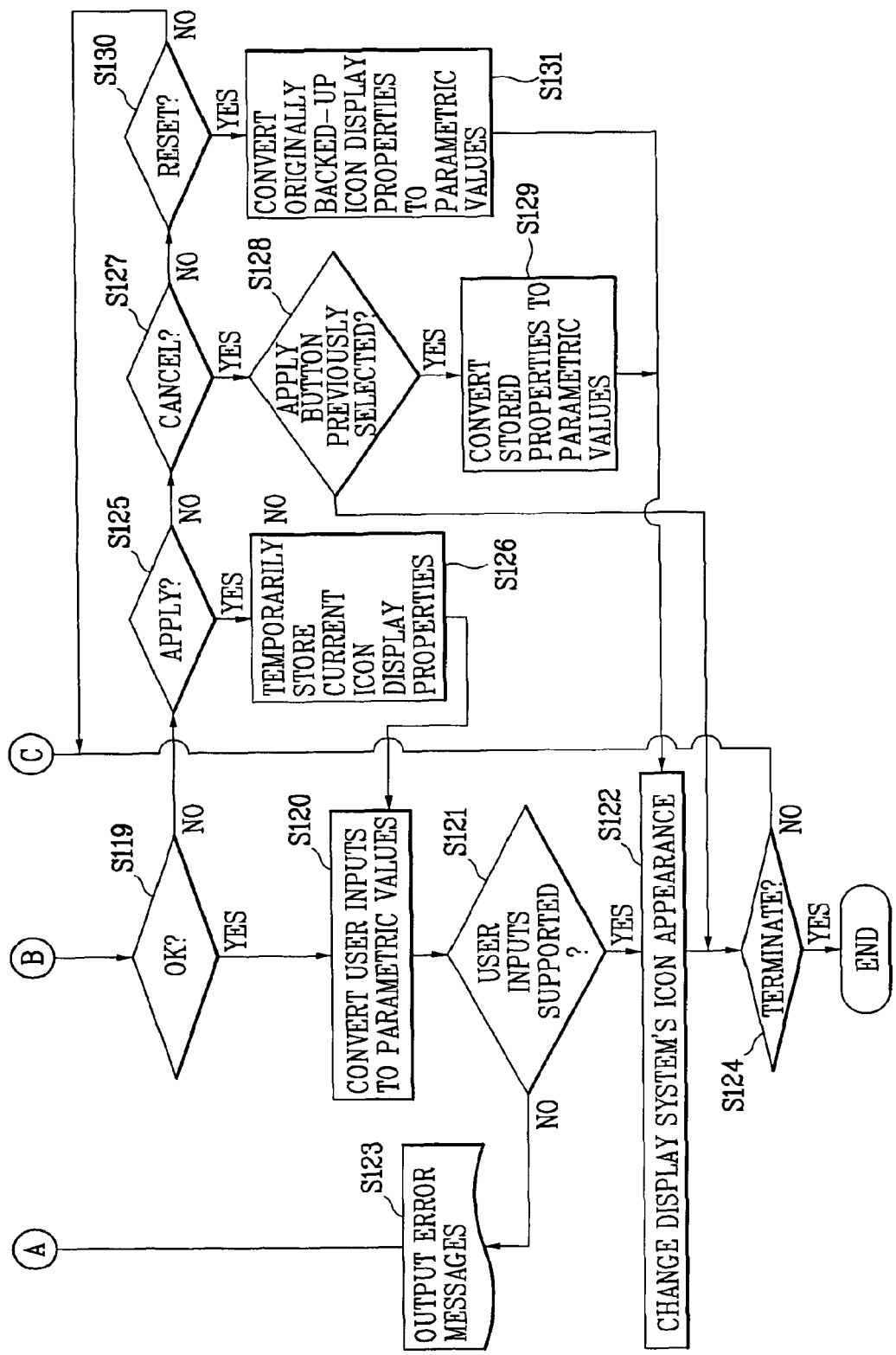

Reference will now be made to the detailed sub-steps of each step shown in FIG. 2, examples of which are illustrated in FIG. 3A and FIG. 3B. For example, Steps S101 to S107 shown in FIG. 3A belong the display properties backup step S1 in FIG. 2. First, the display controller 30 shown in FIG. 1 reads the icon display properties of the display system, which are set for an original icon appearance of the display system, using an application program interface (API) function such as system parameter information (SPI) (S100) and determines whether the property values are valid using a display properties table of the display system (S101). If the property values are determined to be valid, the controller 30 generates a registry subkey in the first memory 40a of the memory unit 40 (S102) and backs up the valid property values in the registry using the API function (S103). On the other hand, if the property values are determined to be invalid in step S101, the controller 30 changes the invalid property values to valid values (S104) and performs steps S102 and S103. Next, the controller 30 further determines whether the valid values are successfully backed up (S105). If the backup has been failed, the controller 30 outputs error messages to the display unit 50 (S106) and deletes the registry subkey generated in the first memory 40a in step S102 (S107).

If the backup is successfully completed, step S2 of the method shown in FIG. 2 will be performed. Steps S108 to S113 correspond to step S2. In step S108, the controller 30 receives a request for displaying an icon control window from a user through the user interface unit 10. Next, the controller 30 reads the icon display properties of the display system (S109) and determines the property values are valid (S110). If the property values are determined to be valid, the controller 30 displays an icon control window that maps with the valid property values on the display screen of the display unit 50

(S111). On the other hand, if the property values are determined to be invalid in step S110, the controller 30 changes the invalid values to valid values (S112) and displays an icon control window that maps with the changed property values (S111).

Figure 4:
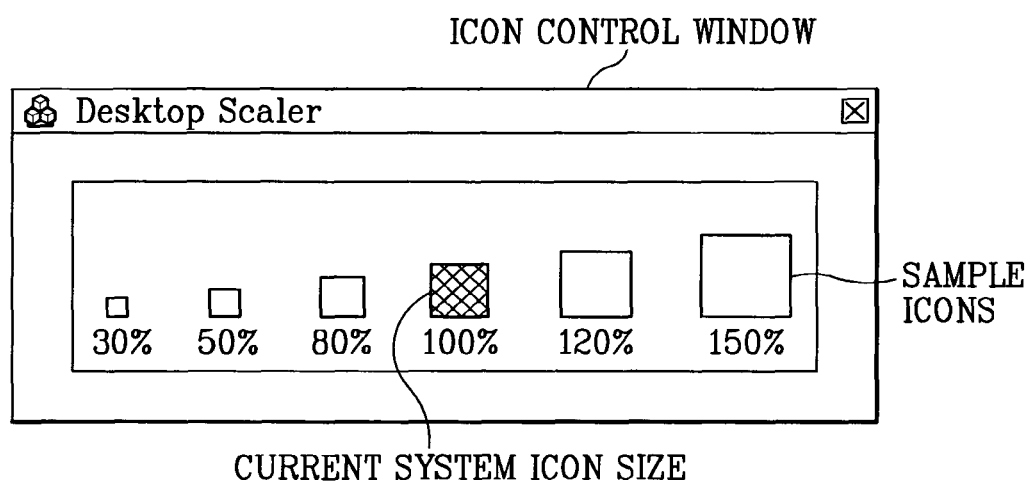
FIG. 4 illustrates a first example of an icon control window according to the present invention.

FIG. 4 illustrates a first example of the icon control window that the display controller 30 displays on the display unit 50 in step S111. Referring to FIG. 4, the control window includes a plurality of sample icons having different sizes, one of which is identical to the current icon size of the display system. Using the icon control window shown in FIG. 4, a user is able to compare the available icon sizes with the current icon size and to select a desired icon size by selecting a corresponding icon. Then the controller 30 changes the icon size of the display system according to the icon size selected by the user from the control window. The desired icon size may be selected by the user by any one of the input devices including keyboards, mouses, and touch pads.

Figure 5:
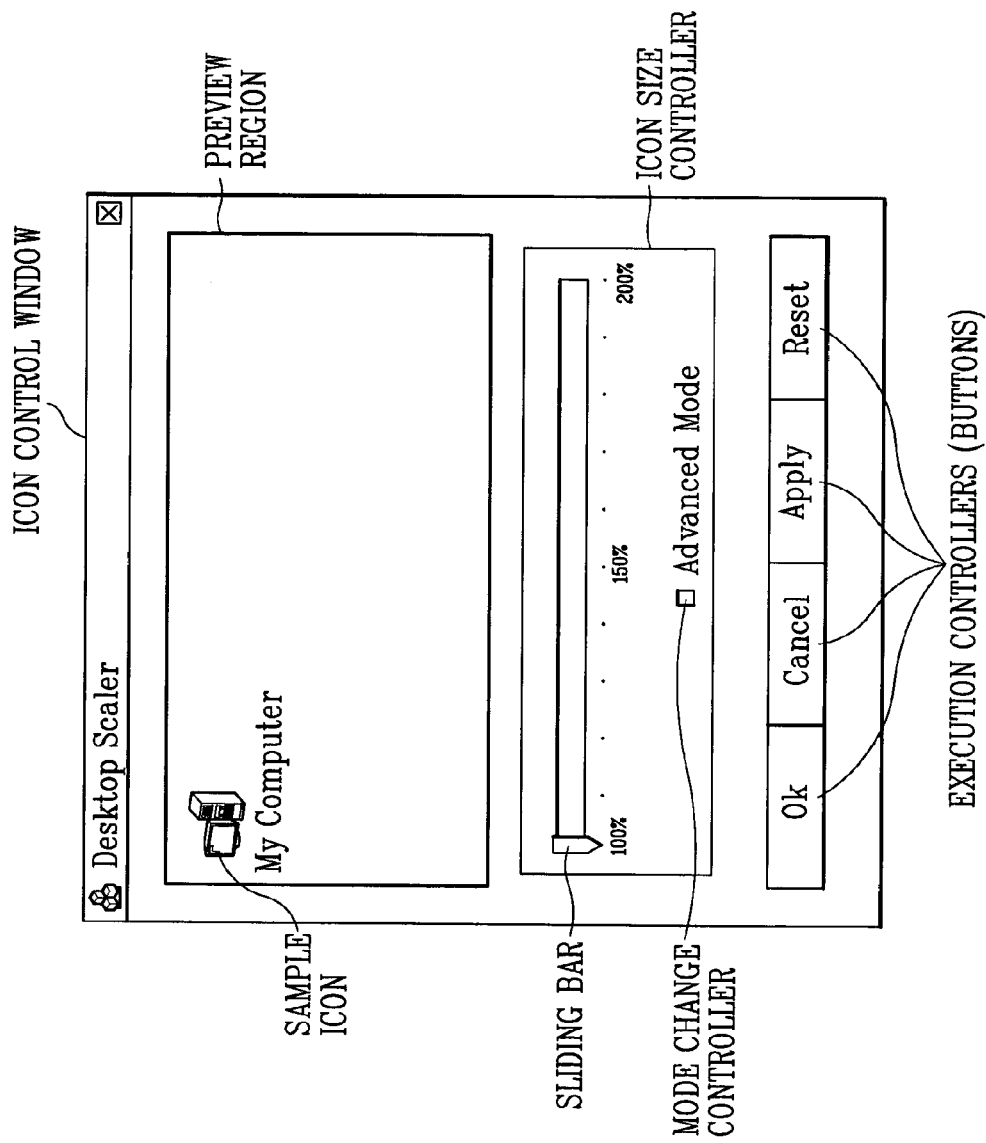
FIG. 5 illustrates a second example of an icon control window (Normal Mode) according to the present invention.

FIG. 5 illustrates a second example of the icon control window that the controller 30 displays on the display unit 50 according to the present invention. As shown in FIG. 5, the icon control window includes an icon size controller, a preview region, a plurality of execution controllers, and a mode change controller (Advance Mode button).

Figure 6:
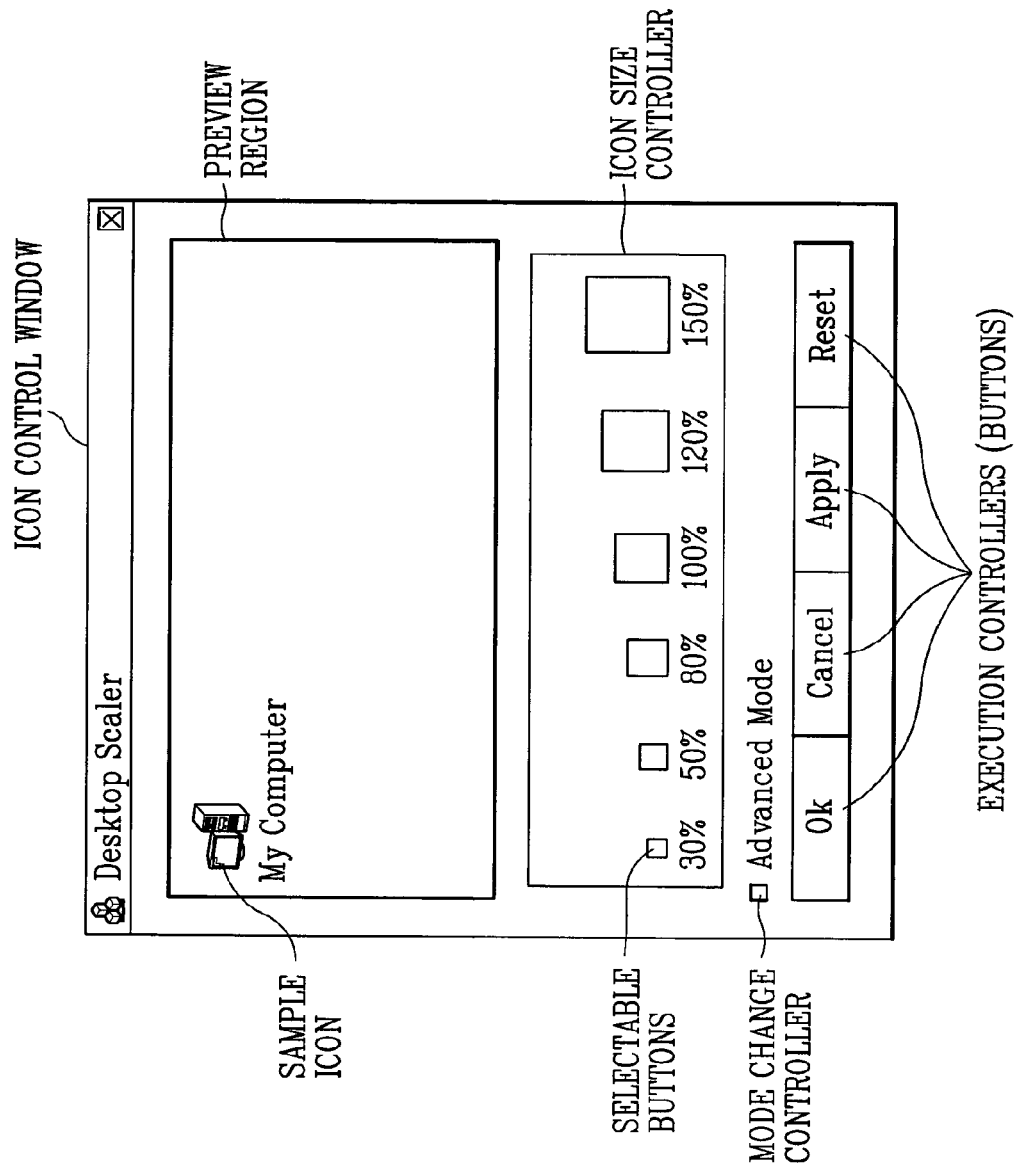
FIG. 6 illustrates a third example of an icon control window according to the present invention.
Figure 7:
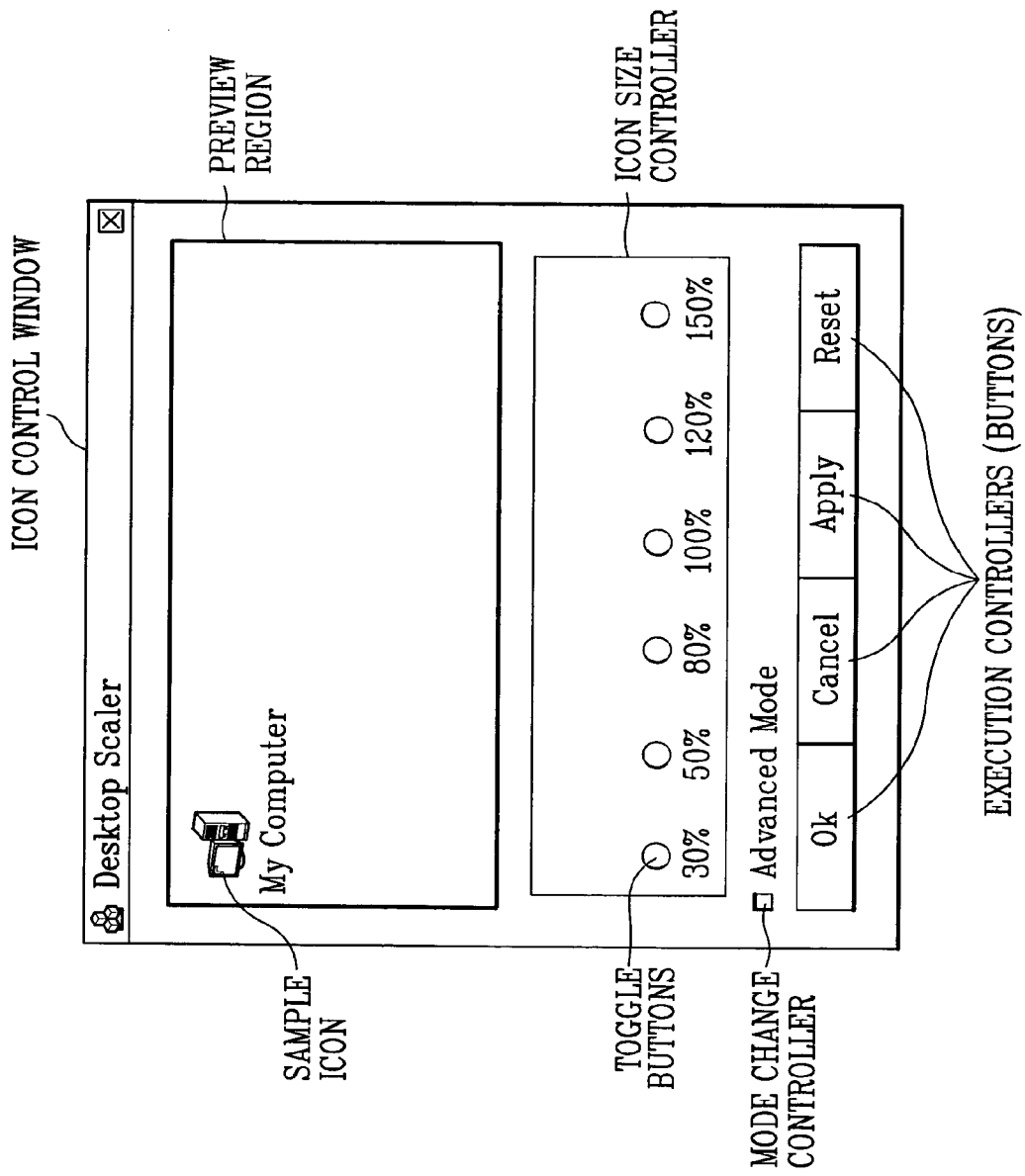
FIG. 7 illustrates a fourth example of an icon control window according to the present invention.

The icon size controller of the control window enables a user to select a desired size of one or more sample icons included in the preview region by providing a sliding bar with minimum and maximum sample icon sizes. The size of the sample icons varies as the user moves the size indicator within the sliding bar. The minimum and maximum sample icon sizes of the sliding bar must be selected from the size range supported by the display system. In addition, FIG. 6 illustrates a third example of the icon control window according to the present invention, in which the icon size controller includes a plurality of selectable buttons corresponding to different icon sizes. The user may simply select one of the buttons using any one of keyboards, mouses, and touch pads for selecting a desired sample icon size. FIG. 7 illustrates a fourth example of the icon control window according to the present invention, in which the icon size controller includes a plurality of selectable toggle buttons representing different icon sizes. When the user selects a desired sample icon size from the selectable sizes using the icon size controller shown in FIG. 5, FIG. 6, or FIG. 7, the size of the sample icons included in the preview region of the control window is automatically changed in accordance with the selected sample icon size.

The execution controllers of the control windows shown in FIG. 5 to FIG. 7 interface with the display system in order to change the icon appearance of the display system in accordance with the sample icon size selected by the user through the icon size controller. The execution controllers include Apply, Cancel, Reset, and Ok buttons. When the Apply button is selected, the controller 30 temporarily stores the display properties of the display system that correspond to the current icon appearance of the display system, and it changes the display properties according to a new icon size selected by the user through the icon size controller. Thereafter, when the Cancel button is selected, the controller 30 further changes the changed display properties to the temporarily stored display properties. In addition, when the Reset button is selected, the controller 30 changes the display properties to the values that were originally backed up before a program for the icon control window was installed. Furthermore, when the Ok button is selected, the controller 30 changes the icon display properties of the display system according to the selected icon size.

Figure 8:
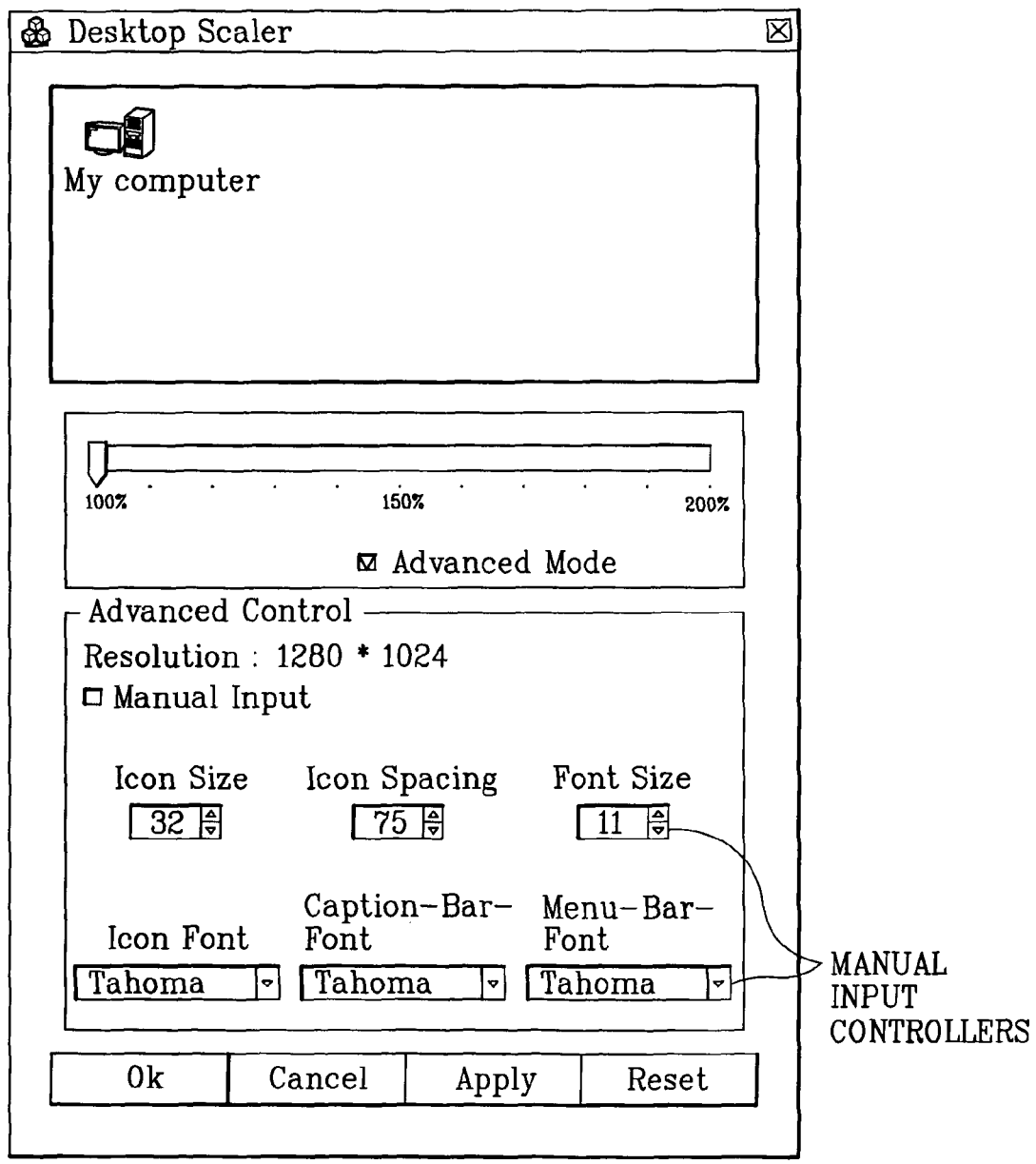
FIG. 8 illustrates the icon control window shown in FIG. 5 in Advanced Mode.

The icon control windows shown in FIG. 5 to FIG. 7 further include a mode change controller (Advance Mode button), which enables the user to have an option for manually inputting at least one of a desired icon size, icon font type, icon font size, and horizontal and vertical icon spacing. For example, when the user selects the Advance Mode button shown in FIG. 5, the control window may further display a Manual Input button and a plurality of manual input controllers as shown in FIG. 8. The control window may further include other display settings such as resolution as shown in FIG. 8. When the Manual Input button is selected (Manual Mode), the plurality of manual input controllers is activated and the user is able to manually enter inputs for a new icon appearance through the manual input controllers. The plurality of manual input controllers include controllers for setting icon size, icon font size, horizontal icon spacing, vertical icon spacing, icon font type, caption-bar-font type, and menu-bar-font type.

Referring back to FIG. 3A, steps S113 to S118 correspond to S3 shown in FIG. 2, which is the step of changing the sample icon's appearance according the user inputs. After the icon control window is displayed on the display screen of the display unit 50 in step S111, the controller 30 determines whether the icon control window is set to Normal Mode or Advance Mode by checking whether the Advance Mode button of the control window is selected (S113). If the Advance mode button is not selected (Normal Mode), the controller 30 determines whether a desired icon size is received from the user through the icon size controller of the icon control window (S114). If it is, the controller 30 changes the sample icon's appearance according to the selected icon size (S115). Otherwise, the controller 30 repeats steps S113 and S114 until an icon size is received.

On the other hand, if the Advance Mode button is selected (Advance Mode), the controller 30 expands the icon control window and further displays a Manual Input button and a plurality of manual input controllers in the expanded area of the control window (S116). The plurality of manual input controllers include controllers for manually receiving icon-related user inputs including at least one of an icon size, icon font size, icon spacing (horizontal and vertical), icon font type, caption-bar-type, and menu-bar-font type. Thereafter, the controller 30 determines whether the Manual Input button is selected (S117). If the Manual Input button is selected (Manual Mode), the plurality of manual input controllers is activated and the controller 30 determines whether the icon-related parameters are manually received through the manual input controllers of the control window (S118). If they are, then the controller 30 changes corresponding one of the icon size, icon font size, icon spacing, icon font type, caption-bar-type, and menu-bar-font type of the sample icons according to the icon-related parameter values received through the manual input controllers (S115). However, if it is determined in step S118 that none of the icon-related parameter values are received, the controller 30 repeats steps beginning from step S113 as shown in FIG. 3A. In addition, if it is determined in step S117 that the Manual Input button is not selected, the manual input controllers are not activated and the controller 30 repeats steps starting from S114.

FIG. 3B illustrates steps S119 to S124 which correspond to the step of adjusting the icon appearance of the display system shown in FIG. 2. If the controller 30 determines in step S119 that the user has selected the OK button of the icon control window, it converts the user-selected parameters to corresponding parametric values (S120) and determines whether the converted values are within the predetermined range of values supported by the display system (S121). If they are, the controller 30 changes the icon appearance of the display system by changing the icon display properties of the display system according to the user-selected parameters (S122). On the other hand, if it is determined in step S121 that the converted parametric values are not supported by the display system, the controller 30 outputs error messages to the display screen of the display unit 50 (S123) and repeats the steps staring from S113. After the icon appearance of the display system is changed in step S122, the controller 30 determines whether to terminate the process of controlling the icon appearance (S124). If it decides to terminate the process, it terminates the process and undisplays the icon control window. Otherwise, it repeats the steps staring from step S113 as shown in FIG. 3B.

Next, if the controller 30 determines in step S125 that the user has selected the Apply button, it temporarily stores the current display properties of the display system corresponding to the current icon appearance in the second memory 40b of the memory unit 40 (S126) and performs the steps beginning from S120. In addition, if the controller 30 determines in step S127 that the user has selected the Cancel button, the controller 30 further determines whether the user has previously selected the Apply button (S128). If the user has, the controller 30 converts the display properties temporarily stored in the second memory 40b in step S126 to corresponding parametric values (S129). Next, the controller 30 changes the icon appearance of the display system according to the converted parametric values (S122) and performs the following steps. On the other hand, if it is determined in step S128 that the Apply button has not been selected, the controller 30 skips step S122 and perform S124.

Next, if the controller 30 determines in step S127 that the Cancel button is not selected, it further determines whether the Reset button is selected (S130). If it has, the controller 30 converts the original icon display properties, which correspond to the original icon appearance and are backed up in the registry in step S103, to corresponding parametric values (S131). Then it changes the icon appearance of the display system according to the parametric values (S122) and performs the following steps. However, if the controller 30 determines in step S130 that the Reset button is not selected by the user, it performs the steps starting from S113.

As shown above, the display system and method according to the present invention enable a user to easily change an icon appearance of the display system, which includes at least one of an icon size, icon font size, icon font type, horizontal icon spacing, and vertical icon spacing. The method used by the display controller 30 of the display system according to the present invention may be achieved by executing a computer-readable medium storing program code for controlling an icon appearance of the display system. The computer program code according to the present invention may be stored in any one of the computer-readable media including Read-Only Memories (ROMs), Random Access Memories (RAMs), magnetic disks, magnetic tapes, and optical disks. When executed by the display controller 30, the program code will perform each step of the method according to the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for providing preview function in a computing device, the method comprising:
displaying an icon control window on a screen of the computing device, wherein the icon control window comprises all of a first option for changing at least one icon size, a second option for changing a grid spacing and a third option for changing a text size;
selecting the first option for changing at least one icon size, wherein the first option has a sliding bar;
changing an original size of at least one icon into a new size of the at least one icon depending on a position of an indicator within the sliding bar;
displaying the at least one icon having the changed size in a first preview region of the screen, wherein the at least one icon is pre-stored in a memory of the computing device;
providing simultaneously at least three font categories on the screen, wherein each of the at least three font categories is independently changeable,
wherein the at least three font categories comprise a first font category for a font of an icon, a second font category for a font of a caption bar and a third font category for a font of a menu bar; and
displaying, when at least one font category of the at least three font categories is changed, the corresponding changed font in another preview region of the screen, by
displaying, when the first font category is changed, the corresponding changed font of the icon in a second preview region of the screen;
displaying, when the second font category is changed, the corresponding changed font of the caption bar in a third preview region of the screen; and
displaying, when the third font category is changed, the corresponding changed font of the menu bar in a fourth preview region of the screen.

2. The method of claim 1, further comprising:
selecting the second option for changing a grid spacing, wherein the grid spacing defines a distance between first icon and second icon based on a horizontal axis and a vertical axis;
changing an original distance into new distance between the first icon and the second icon; and
displaying the at least one icon according to said new distance, wherein the at least one icon is pre-stored in the memory of the computing device.

3. The method of claim 2, further comprising:
selecting the third option for changing a text size, wherein the text represents a title corresponding to the at least one icon;
changing an original text size into new text size of the at least one icon; and
displaying the at least one icon having the changed text size, wherein the at least one icon is pre-stored in the memory of the computing device.

4. The method of claim 3, wherein the indicator within the sliding bar is movable only between minimum value and maximum value.

5. The method of claim 4, wherein the second displaying step performs only if corresponding display property parameter values of the new icon size are within a predetermined range of values supported by the computing device.

6. The method of claim 1, wherein the computing device provides fourth option for controlling a menu bar or a caption bar.

7. The method of claim 1, wherein a command for performing the icon control window is received via an user interface unit.

8. The method of claim 7, wherein the user interface unit corresponds to at least one a keyboard, a mouse or a touchpad.

9. The method of claim 1, wherein the computing device corresponds to a laptop, a PDA (Personal Digital Assistant) or a mobile data processing unit.

10. The method of claim 1, wherein the each of the at least three font categories is changeable by manual input controllers.

11. The method of claim 10, further comprising:
- converting a user-selected parameter to a corresponding parametric value;
- changing the at least one font category based on the converted parametric value; and
- storing the changed font category in the memory of the computing device.

* * * * *